(12) United States Patent
Li et al.

(10) Patent No.: US 11,675,255 B2
(45) Date of Patent: Jun. 13, 2023

(54) HOLDING MECHANISM FOR STABILIZER AND HANDHELD STABILIZER

(71) Applicant: GUANGDONG SIRUI OPTICAL CO., LTD., Zhongshan (CN)

(72) Inventors: Jie Li, Zhongshan (CN); Weibo Luo, Zhongshan (CN)

(73) Assignee: GUANGDONG SIRUI OPTICAL CO., LTD., Zhongshan (CN)

( * ) Notice: Subject to any disclaimer, the term of this patent is extended or adjusted under 35 U.S.C. 154(b) by 0 days.

(21) Appl. No.: 16/478,052

(22) PCT Filed: Apr. 4, 2019

(86) PCT No.: PCT/CN2019/081415
§ 371 (c)(1),
(2) Date: Jul. 16, 2019

(87) PCT Pub. No.: WO2020/177177
PCT Pub. Date: Sep. 10, 2020

(65) Prior Publication Data
US 2021/0080812 A1    Mar. 18, 2021

Related U.S. Application Data

(63) Continuation of application No. 15/566,720, filed as application No. PCT/CN2016/089982 on Jul. 14, 2016, now Pat. No. 10,558,111.

(51) Int. Cl.
*G03B 17/56*     (2021.01)
*F16M 11/08*     (2006.01)
(Continued)

(52) U.S. Cl.
CPC ........... *G03B 17/563* (2013.01); *F16M 11/08* (2013.01); *F16M 11/205* (2013.01);
(Continued)

(58) Field of Classification Search
CPC .. G03B 17/563; F16M 11/08; F16M 11/2057; F16M 11/2064; F16M 11/2071;
(Continued)

(56) References Cited

U.S. PATENT DOCUMENTS 9,458,963 B1 * 10/2016 Choi ..................... F16M 13/04
10,558,111 B2    2/2020 Li
(Continued)

FOREIGN PATENT DOCUMENTS

CN    203522885    4/2014
CN    204420520    6/2015
(Continued)

OTHER PUBLICATIONS

Office Action dated Sep. 9, 2019 for U.S. Appl. No. 15/566,720 (pp. 1-9).

*Primary Examiner* — Christopher Garft
(74) *Attorney, Agent, or Firm* — Loeb & Loeb LLP

(57) ABSTRACT

A stabilizer folding structure and a handheld stabilizer. a stabilizer folding structure for rotationally connecting the motor base and the rocker arm such that the motor base and the rocker arm have an unfolded first state and a stored second state during relative rotation, comprising: an elastic member, applying An elastic force for abutting the motor base and the rocker arm; and a snap structure at a position where the motor base abuts the rocker arm, in the first state and the second state, The snap structure is engaged to restrict relative rotation of the motor base and the rocker arm. In other states, the snap structure is disengaged such that the motor base and the rocker arm are relatively rotatable. The folding structure of aspects of the invention facilitates the folding and storage of the stabilizer, and is convenient for the user to use.

16 Claims, 7 Drawing Sheets

(51) Int. Cl.
*F16M 11/20* (2006.01)
*F16M 13/04* (2006.01)

(52) U.S. Cl.
CPC ..... *F16M 11/2057* (2013.01); *F16M 11/2064* (2013.01); *F16M 11/2071* (2013.01); *F16M 13/04* (2013.01); *F16M 2200/024* (2013.01); *F16M 2200/041* (2013.01); *F16M 2200/042* (2013.01)

(58) Field of Classification Search
CPC ............. F16M 13/04; F16M 2200/024; F16M 2200/041; F16M 2200/042; F16M 11/123; F16L 11/025
USPC ........... 369/420; 16/319, 322, 334, 328, 329
See application file for complete search history.

(56) References Cited

U.S. PATENT DOCUMENTS

| | | | | |
|---|---|---|---|---|
| 2009/0158554 | A1* | 6/2009 | Chang | F16M 11/10 16/241 |
| 2010/0059637 | A1* | 3/2010 | Zhou | F16M 11/2021 248/188.8 |
| 2010/0079932 | A1* | 4/2010 | Zhou | F16M 11/2021 361/679.01 |
| 2011/0099757 | A1* | 5/2011 | Chang | G06F 1/1681 16/297 |
| 2013/0176412 | A1 | 7/2013 | Chen | |
| 2016/0252799 | A1 | 9/2016 | Li | |
| 2018/0187824 | A1* | 7/2018 | Yan | F16M 11/04 |
| 2018/0259123 | A1 | 9/2018 | Shim | |
| 2019/0137852 | A1 | 5/2019 | Li | |
| 2021/0062963 | A1* | 3/2021 | Nam | F16M 11/10 |
| 2021/0123564 | A1* | 4/2021 | Zhao | G03B 17/563 |
| 2021/0131609 | A1* | 5/2021 | Zhao | F16M 11/105 |
| 2021/0231260 | A1* | 7/2021 | Xie | F16M 13/04 |

FOREIGN PATENT DOCUMENTS

| | | |
|---|---|---|
| CN | 204805905 | 11/2015 |
| CN | 105592267 A | 5/2016 |
| CN | 205908975 | 1/2017 |
| CN | 107278246 | 10/2017 |
| CN | 108591789 | 9/2018 |
| CN | 109404704 | 3/2019 |
| CN | 109827056 | 5/2019 |
| CN | 109854924 | 6/2019 |

* cited by examiner

HOLDING MECHANISM FOR STABILIZER AND HANDHELD STABILIZER

CROSS-REFERENCE TO RELATED APPLICATIONS

This is a national stage application of PCT international application serial number PCT/CN2019/081415, filed on Apr. 4, 2019, which claims priority to a Chinese patent application, application number 201910169064.7, filed on Mar. 6, 2019, whose applications are incorporated by reference in their entirety herein. The present application is further a continuation-in-part of U.S. application Ser. No. 15/566,720, filed on Oct. 15, 2017, which is a US national stage application of PCT international application serial number PCT/CN2016/089982, filed on Jul. 14, 2016, which claims priority to a Chinese application, application number 201610445963.1, filed on Jun. 16, 2016.

TECHNICAL FIELD

Aspects of the invention relates to a head mount stabilizer, in particular to a stabilizer folding structure and a handheld stabilizer.

BACKGROUND

With the popularity and popularity of webcasting and short video, handheld stabilizers are becoming more and more widely used. Common handheld stabilizers include handles and single-axis or multi-axis rotating heads. For handheld stabilizers, In order to ensure the protection of the stabilizer shaft, a large storage space is often required, and since the stability of the stabilizer structure is low, collision damage is easily generated after storage, and thus a handheld stabilizer that is convenient for folding and storage is required.

SUMMARY

In order to solve the technical problem of inconvenience in stabilizing the stabilizer in the prior art, the aspects of the invention provides a folding structure for a collapsible container.

Meanwhile, in order to solve the technical problem of inconvenience in the storage of the stabilizer in the prior art, the aspects of the invention provides a handheld stabilizer which is easy to fold and store.

In a first aspect, the aspects of the invention provides a stabilizer folding structure for rotationally connecting a motor base and a rocker arm such that the motor base and the rocker arm have an unfolded first state and a stored state during relative rotation Two states, which include:

an elastic member that applies an elastic force that abuts the motor base and the rocker arm; and a snapping structure, disposed at a position where the motor base abuts the rocker arm, and in the first state and the second state, the snap structure is engaged to limit the motor seat and the rocker arm relative to each other Rotating, in other states, the snap structure is disengaged such that the motor base and the rocker arm are relatively rotatable.

The motor base and the rocker arm abut, the snap structure is disposed on the abutting abutting surface, and includes a buckle disposed on the motor base/rocker arm and correspondingly disposed on the At least two snap positions on the rocker arm/motor base, in the first state, the buckle is engaged with one of at least two of the snap positions, and in the second state, the buckle and other cards One of the bits is engaged.

The stabilizer folding structure further includes:
a rotating shaft, the two ends are respectively connected to the motor base and the rocker arm, so that at least one of the motor base and the rocker arm is rotatable about the rotating shaft;

The stabilizer folding structure further includes:
a stop sleeve, a first mounting slot is defined in the connection between the motor base and the rocker arm, and one end of the rotating shaft is fixedly mounted in the first mounting slot, and the stop sleeve is fixedly disposed on the Inside the first mounting slot; and a positioning sleeve, a second mounting slot is defined in the rocker arm and the motor seat, the other end of the rotating shaft is rotatably connected to the second mounting slot, and the positioning sleeve is fixedly disposed on the second In the mounting slot, when the motor base is rotatably connected to the rocker arm, one end surface of the positioning sleeve abuts against one end surface of the stop sleeve, and the buckle and the snap position are disposed at the positioning sleeve and the end surface of the stop sleeve abut.

The buckle is at least one wedge-shaped boss disposed on the end surface of the positioning sleeve, and the latching position is at least two recesses corresponding to the wedge-shaped bosses disposed on the end surface of the stop sleeve, In the first state and the second state, the wedge-shaped boss is engaged in the recess, and in other states, the wedge-shaped boss is rotatably abutted against the end surface of the stop sleeve.

The buckle is two wedge-shaped bosses disposed on the end surface of the positioning sleeve and disposed symmetrically at 180 degrees, and the latching positions are two recesses corresponding to the end faces of the stop sleeve.

The stabilizer folding structure further includes:
The limiting structure is disposed at a position where the rocker arm is coupled to the motor base for providing a rotation path of the rocker arm and the motor base relative to each other.

The limiting structure includes a limiting protrusion disposed on one end surface of the positioning sleeve and a limiting slot formed on one end surface of the stop sleeve, the rocker arm rotating relative to the motor seat During the process, the limiting protrusion slides in the limiting slot.

The limiting slot has an arc shape with an angle of 180°. When the limiting protrusion slides to the limit position of one side in the limiting slot, the folding structure is in the first state, and the limiting protrusion is The folded structure is in the second state when sliding in the limiting slot to the other extreme position.

The elastic member is disposed in the second mounting slot, one end of which abuts against the other end surface of the positioning sleeve, and the other end is provided with a pressing structure to make the elastic member in a compressed state.

The pressing structure is a compression nut which is screwed to the shaft end of the rotating shaft, and the elastic member is a disc spring, and the disc spring is sleeved between the compression nut and the positioning sleeve.

The stabilizer folding structure further includes:
a locking structure is detachably disposed at a position where the rocker arm is coupled to the motor base. When the locking structure is in an open state, the rocker arm and the motor base are relatively rotatable, and the locking structure is in a lock In the stop state, the rocker arm is fixedly connected to the motor base.

In a second aspect, the aspects of the invention provides a handheld stabilizer comprising the above described stabilizer folding structure.

The handheld stabilizer further includes: a handle assembly; and

The head mount assembly includes a heading arm, a cross roller arm and a tilting arm that are sequentially connected in rotation. One end of the tilting arm is provided with a clamping portion, and one end of the heading arm is rotatably connected to the handle assembly through the motor seat. The stabilizer folding structure is for connecting the motor base and the heading arm.

A resilient latch is disposed at a position where the heading arm is coupled to the cross roller arm, and a position where the cross roller arm and the tilting arm are connected.

The technical solution of the aspects of the invention has the following beneficial effects:

1) The stabilizer folding structure provided by the aspects of the invention is configured to rotate and connect the motor base and the rocker arm, so that the motor base and the rocker arm have a first state of being unfolded and a second state of being accommodated during relative rotation, so that the stabilizer may be Folded for easy storage. The folding structure includes an elastic member and a snap structure, and the elastic member exerts an elastic force for abutting the motor base and the rocker arm, thereby making the motor base and the rocker arm connection more stable and convenient for the user. The snap structure is disposed at a position where the motor base abuts the rocker arm. In the first state and the second state, the snap structure is engaged to restrict the relative rotation of the motor base and the rocker arm. In other states, the snap structure is disengaged. In order to make the motor base and the rocker arm relatively rotatable, the snap structure makes the structure of the stabilizer more stable during use and storage, and avoids the occurrence of shaking and affects the use and storage.

2) The stabilizer folding structure provided by the aspects of the invention, the motor base and the rocker arm abut, the snap structure is disposed on the abutting abutting surface, and comprises a buckle disposed on the motor base/rocker arm and correspondingly disposed on the rocker At least two snap positions on the arm/motor base, in the first state, the buckle and one of the at least two snap positions engagement, in the second state, the buckle is engaged with one of the other snap positions. Through the switching of the buckle and the different snap positions, the expansion and storage of the stabilizer are realized, which is convenient for the user to switch quickly.

3) The stabilizer folding structure provided by the aspects of the invention further includes a rotating shaft, a stop sleeve and a limiting sleeve. The first mounting slot is opened at the connection between the motor base and the rocker arm, and a section of the rotating shaft is fixedly installed in the first mounting slot. The stop sleeve is fixedly disposed in the first mounting slot, and the second mounting slot is opened at the connection between the rocker arm and the motor seat, and the other end of the rotating shaft is rotatably connected with the second mounting slot, and the positioning sleeve is fixedly disposed in the second mounting slot When the motor base and the rocker arm are rotatably connected, one end surface of the positioning sleeve abuts against one end surface of the stop sleeve, and the buckle and the snap position are disposed on the end surface of the positioning sleeve and the stop sleeve abutting, and the rotating shaft is set The connection between the stop sleeve and the limit sleeve facilitates the processing and assembly of the folded structure.

4) The stabilizer folding structure provided by the aspects of the invention, the buckle is two wedge-shaped bosses disposed on the end surface of the positioning sleeve and arranged symmetrically at 180°, and the snap position is corresponding to two recesses provided on the end surface of the stop sleeve. The wedge-shaped boss and the recess facilitate the disengagement and engagement of the snap structure, and the assembly effect is better, and the stabilizer state switching is more labor-saving.

5) The stabilizer folding structure provided by the aspects of the invention further includes a limiting structure, which is disposed at a connection position between the rocker arm and the motor base, and is configured to provide a rotation path of the rocker arm and the motor seat relative to each other, so that the rotation path is fixed and prevented. When the rocker arm rotates relative to the motor base, the internal electrical connection line is twisted.

6) The stabilizer folding structure provided by the aspects of the invention further comprises a locking structure, which is openably arranged at a connection position between the rocker arm and the motor seat. When the locking structure is in an open state, the rocker arm and the motor seat are relatively rotatable, and the locking structure is at a position In the locked state, the rocker arm is fixedly connected to the motor base, which further improves the stability of the stabilizer during use and storage, and is convenient for the user to use.

7) The handheld stabilizer provided by the aspects of the invention comprises the above-mentioned stabilizer folding structure, so that the stabilizer is conveniently folded and stored for user convenience.

BRIEF DESCRIPTION OF THE DRAWINGS

In order to more clearly illustrate the specific embodiments of the aspects of the invention or the technical solutions in the prior art, the drawings used in the specific embodiments or the description of the prior art will be briefly described below, and obviously, the attached in the following description The drawings are some embodiments of the aspects of the invention, and those skilled in the art may obtain other drawings based on these drawings without any creative work.

DETAILED DESCRIPTION

Description of the Reference Numbers

1—motor base; 11—first mounting slot; 2—elastic member; 3—rotating shaft; 31—T shaped lug; 4—stop sleeve; 41—recess; 42—limiting slot; 5—positioning sleeve; 51—wedge boss; 52—limiting protrusion; 6—elastic lock; 7—compression nut; 81—latch pin; 82—locking opening; 9—head mount assembly; 91—heading arm; 911—second mounting slot; 92—cross roller arm; 93—tilting arm; 931—clamping portion; 10—handle assembly.

The technical solutions of the aspects of the invention will be clearly and completely described in the following with reference to the accompanying drawings. It is obvious that the described embodiments are a part of the embodiments of the aspects of the invention, but not all embodiments. All other embodiments obtained by those skilled in the art based on the embodiments of the aspects of the invention without creative efforts are within the scope of the aspects of the invention. Further, the technical features involved in the different embodiments of the aspects of the invention described below may be combined with each other as long as they do not constitute a conflict with each other.

The folding structure provided by aspects of the invention may be used for a single-axis or multi-axis handheld stabilizer, thereby rotatingly connecting the motor base and the rocker arm, so that there is an unfolded first state between the rocker arm and between the handle and the rocker arm and the second state of folding storage. The folding structure comprises an elastic member and a snap structure, wherein the snap structure is disposed at a position where the motor base abuts the rocker arm, and the snap structure is engaged to limit the motor seat and the rocker arm during the relative rotation of the motor base and the rocker arm relative rotation, so that the user is more stable when using or accommodating the stabilizer, the snap structure is disengaged so that the motor base and the rocker arm may be rotated relative to each other, thereby switching the use state of the stabilizer, and the elastic member is always provided to make the motor seat and shake The elastic force of the arm abuts, making the folded structure more stable and reliable.

Figure 1:
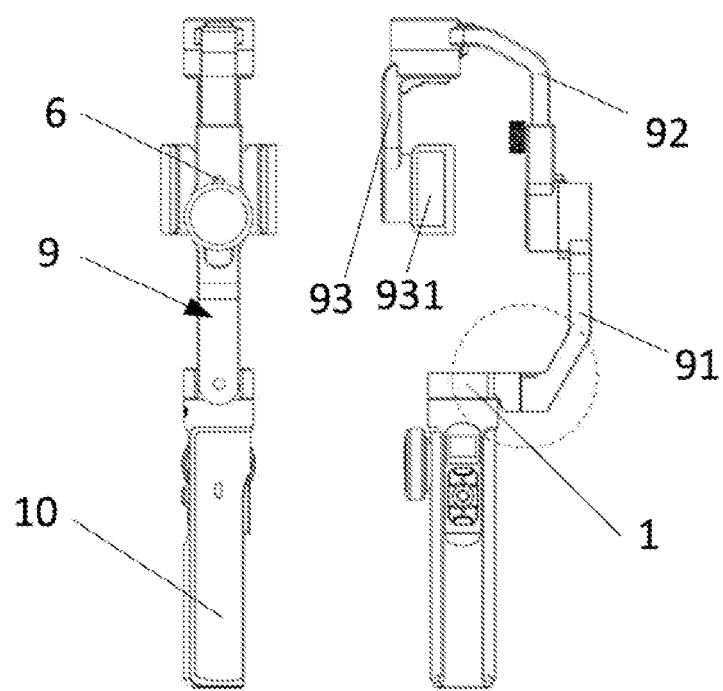
FIG. 1 is a schematic view showing the structure of a handheld stabilizer in a first state according to an embodiment of the aspects of the invention.

One embodiment of a handheld stabilizer in accordance with the aspects of the invention is illustrated in FIGS. 1 through 7, which in the present embodiment are three-axis handheld stabilizers including a handle assembly 10 and a head mount assembly 9. The head mount assembly 9 includes a heading arm 91, a cross roller arm 92, and a tilting arm 93 that are sequentially connected by a rotating motor. One end of the tilting arm 93 is a clamping portion 931 for holding the mobile device. One end of the heading arm 91 is rotatably coupled to the upper end of the handle assembly 10 via the motor base 1. As shown in FIG. 1, the stabilizers are controlled by three rocker arms to stabilize the omnidirectional direction of the mobile device, making it easy for users to shoot.

In the present embodiment, the folding structure is disposed between the motor base 1 and the heading arm 91, and one end of the heading arm 91 abuts against one end surface of the motor base 1, and the first mounting slot 11 is opened at the end surface position of the motor base 1. A second mounting slot 911 is defined at an end surface of the heading arm 91. When the heading arm 91 is connected to the motor base 1, the first mounting slot 11 communicates with the second mounting slot 911, and the folded structure is disposed in the first mounting slot 11 and the second mounting slot 911.

Figure 2:
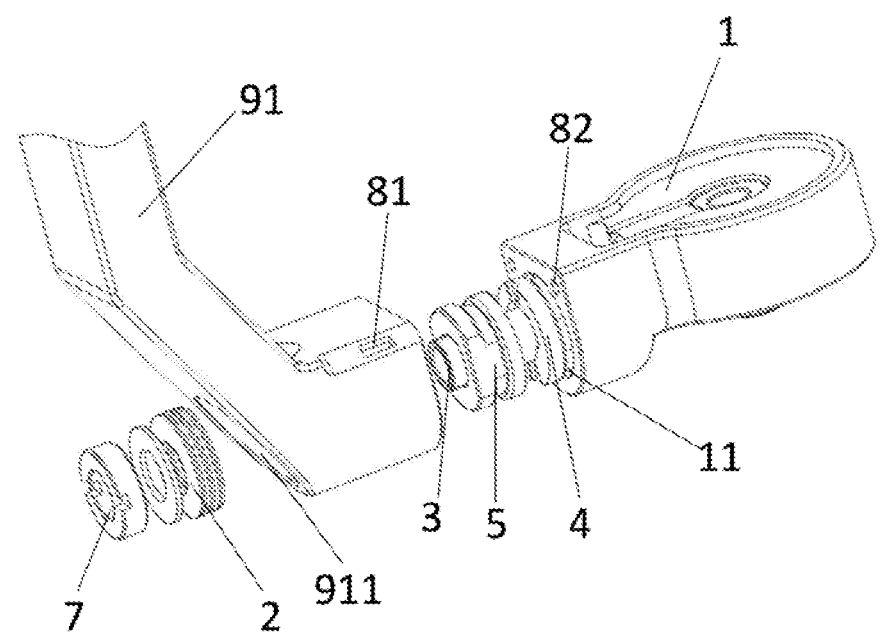
FIG. 2 is an exploded view of a folded structure in accordance with an embodiment of the aspects of the invention.
Figure 3:
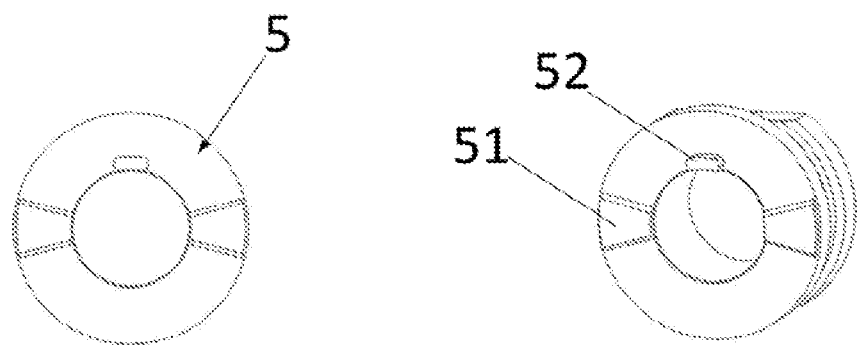
FIG. 3 is a schematic structural view of a positioning sleeve according to an embodiment of the aspects of the invention.
Figure 4:
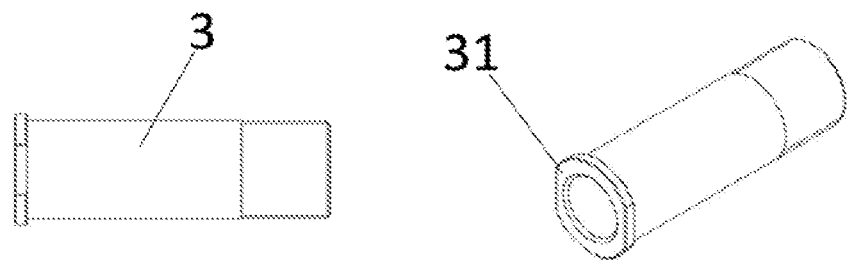
FIG. 4 is a schematic view showing the structure of a rotating shaft according to an embodiment of the aspects of the invention.
Figure 5:
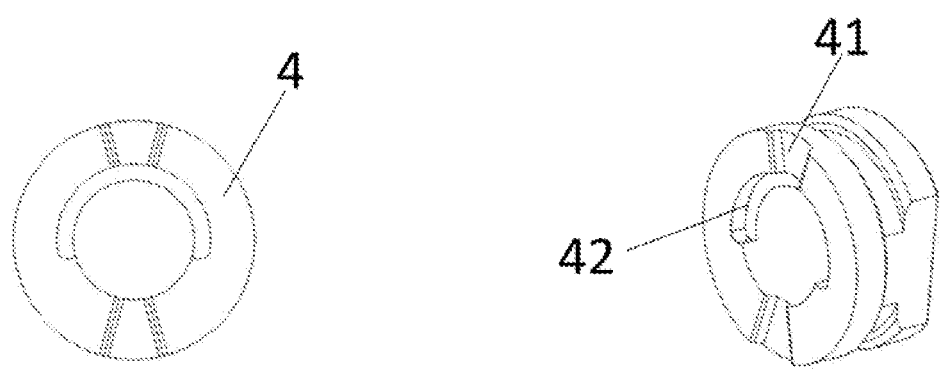
FIG. 5 is a schematic structural view of a stop sleeve according to an embodiment of the aspects of the invention.
Figure 6:
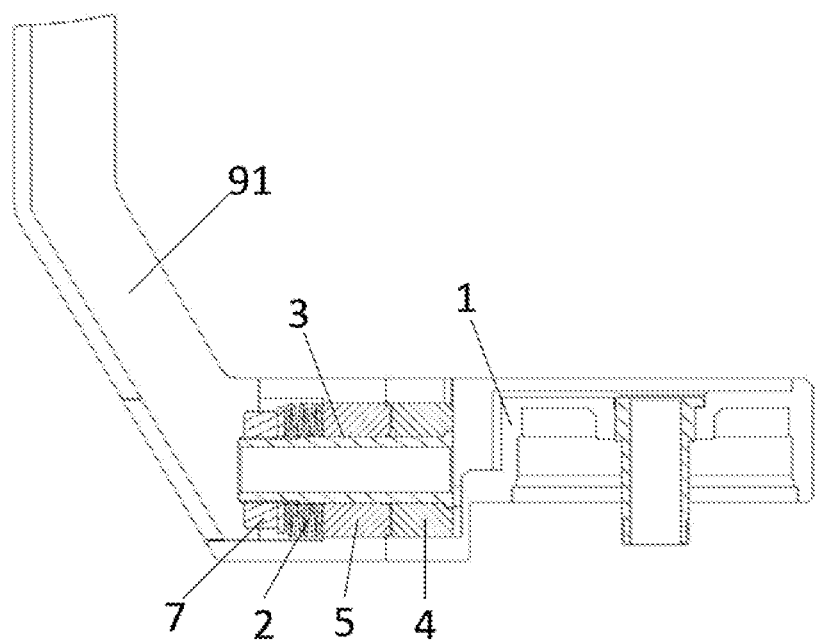
FIG. 6 is a cross-sectional structural view of a folded structure in accordance with an embodiment of the aspects of the invention.

As shown in FIGS. 2 to 6, the folded structure includes a rotating rotating shaft 3, a stop sleeve 4, a positioning sleeve 5, an elastic member 2, and a compression nut 7. As shown in FIG. 3 and FIG. 5, the positioning sleeve 5 and the stop sleeve 4 are substantially annular, and the side wall is provided with a thrust plane. The inner wall of the mounting slot is provided with a corresponding thrust surface to limit the positioning sleeve 5 and The sleeve 4 is axially rotated, and a limiting ring recess is formed on the side wall, and a corresponding limiting structure is arranged on the inner wall of the mounting slot to axially limit the positioning sleeve 5 and the stop sleeve 4, so that the stop sleeve 4 is fixedly mounted. In the first mounting slot 11, the positioning sleeve 5 is fixedly mounted in the second mounting slot 911. As shown in FIG. 4, one end of the rotating rotating shaft 3 is provided with a T-shaped lug 31, and one end of the stop sleeve 4 is provided with a T-shaped recess that cooperates with the T-shaped lug 31, so that the rotating rotating shaft 3 is fixedly mounted on the stop sleeve 4 The inside, that is, the rotating shaft 3, the stop sleeve 4 and the motor base 1 are fixedly assembled.

When the motor base 1 is assembled with the heading arm 91, the rotating rotating shaft 3 is fixedly mounted through the stop sleeve 4, the stop sleeve 4 is fixedly mounted in the first mounting slot 11, and the positioning sleeve 5 is fixedly mounted in the second mounting slot 911, the rotating rotating shaft 3 The other end passes through the positioning sleeve 5 in the second mounting slot 911. The elastic member 2 is a disc spring, and a plurality of disc springs are sleeved on the other end of the rotating rotating shaft 3 and pressed by the compression nut 7, and the nut 7 is pressed to make the stop sleeve 4 abut against the end surface of the positioning sleeve 5, thereby realizing the motor seat 1's connection to the heading arm 91. As shown in FIG. 3 and FIG. 5, two end faces of the positioning sleeve 5 are provided with two wedge-shaped bosses 51. The two wedge-shaped bosses 51 are symmetrically arranged at 180 degrees, and one end surface of the stop sleeve 4 is opened and The wedge-shaped boss 51 corresponds to the two recesses 41 of the structure. In the first state, the wedge boss 51 is engaged with the recess 41. In the second state, the stop sleeve 4 is rotated by 180°, and the wedge boss 51 is again engaged with the recess 41.

The folding storage of the handle assembly 10 is achieved.

In the present embodiment, a finite-position structure is provided between the positioning sleeve 5 and the stop sleeve 4, and the limiting structure provides a path for rotation of the two, thereby avoiding distortion of the internal electrical connection line caused by unidirectional rotation. The limiting structure includes a limiting protrusion 52 disposed on the end surface of the positioning sleeve 5 and a limiting slot 42 formed on the stop sleeve 4. When the positioning sleeve 5 and the stop sleeve 4 are rotatably engaged, the limiting protrusion 52 is The limiting slot 42 slides back and forth. As shown in FIG. 5, the limiting slot 42 has an arc shape with an angle of 180°. When the limiting protrusion 52 slides in the limiting slot 42 to the left limit position, the wedge boss 51 and the recess 41 Engagement, when the limiting protrusion 52 is rotated through 180° to the right limit position, the wedge boss 51 is rotated by 180° at the same time to engage with the recess 41 again.

In the present embodiment, the heading of the heading arm 91 and the motor base 1 is provided with a locking structure. As shown in FIG. 2, the locking structure includes a latch pin 81 disposed on the heading arm 91 and a correspondingly disposed on the motor base 1. The locking openings 82 allow the user to dial the latch to limit the rotation of the motor base 1.

When the user uses the stabilizer, the stabilizer is in the first state, and its structure is as shown in FIG. 1. When the stabilizer is switched from the first state to the second state, the user dials the latch pin 81 to open the locking structure, and rotates the handle assembly. 10, the disc spring is further compressed, the wedge-shaped boss 51 is turned out of the recess 41, the wedge-shaped boss 51 abuts on the end surface of the stop sleeve 4, when the handle assembly is rotated by 180°, the limiting protrusion 52 is at the limit The inside of the limiting slot 42 is rotated to the limit position. At this time, the wedge-shaped boss 51 is rotated through 180° to engage with the recess 41 again, and the handle assembly 10 is rotated through 180° to complete the folding storage.

In the present embodiment, the position where the heading arm 91 is connected to the cross roller arm 92, the position where the cross roller arm 92 and the tilting arm 93 are connected is provided with an elastic lock 6, and the elastic lock 6 stabilizes the rocker arm connection structure.

Figure 7:
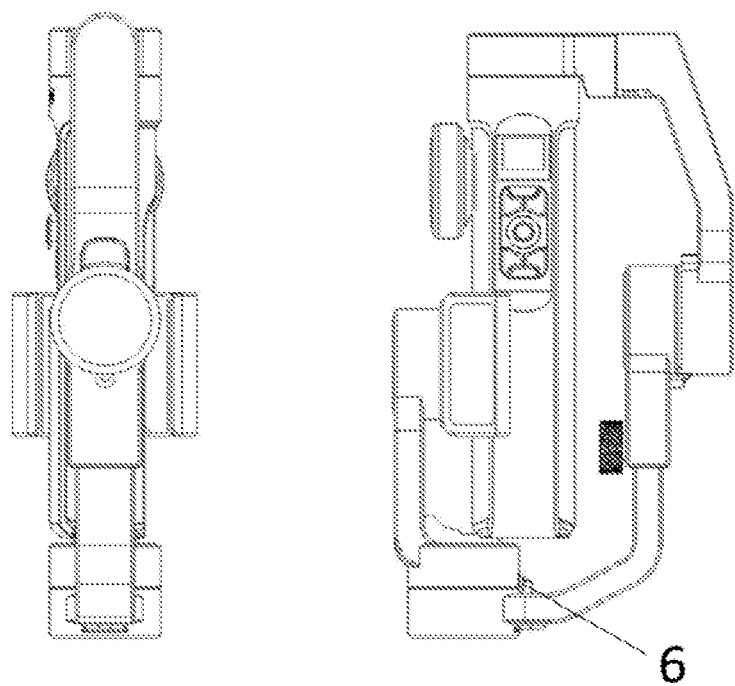
FIG. 7 is a schematic illustration of the structure of the handheld stabilizer in a second state in accordance with one embodiment of the aspects of the invention.

At the same time, the elastic lock 6 is elastically deformed when the rocker arm is pressed by the external force, and the rocker arm is protected after being stored. As shown in FIG. 7, when the stabilizer is in the second state, the handle assembly 10 is rotated 180° relative to the heading arm 91, the cross roller arm 92 is rotated to a side remote from the handle assembly 10, and the tilting arm 93 is rotated to position the handle assembly 10 In the clamping portion 931, the clamping portion 931 is clamped and fixed to the handle assembly 10 by the elastic lock 6, and the structure after the storage is stabilized to protect the stabilizer. The structure and principle of the stabilizer folding structure and the handheld stabilizer of the aspects of the invention have been described above. Based on the above embodiments, the aspects of the invention may have other alternative embodiments.

In some alternative embodiments, it should be noted that the above-described stabilizer folding structure may be used not only for a three-axis stabilizer, but also other structures suitable for rocker arm folding, such as a single-axis stabilizer, a self-timer, and the like. At the same time, the above-mentioned folding structure may be disposed not only between the handle assembly and the heading arm, but also between the heading arm and the cross roller arm, the cross roller arm and the tilting arm, which is not limited in the present disclosure.

In another alternative embodiment, the folding structure comprises an elastic member and a snap structure, the snap structure comprises a buckle and a curved sliding slot, and the buckle is engaged with the sliding slot to realize the connection of the motor seat and the rocker arm, and the buckle Rotating in the limiting slot realizes the rotational folding of the rocker arm and the motor base. In the present embodiment, it is not necessary to provide a rotating shaft, and the folding structure is simplified.

In still other alternative embodiments, the snap position may be set to a plurality of positions, and the folding direction of the card is matched with the snap positions at different positions to achieve two or more folding directions, thereby satisfying different storage modes.

In still other alternative embodiments, a limit ring may be disposed at both ends of the rotating shaft, and the rotating shaft is rotatably connected with the limiting ring, and the limiting ring limits the axial direction of the rotating shaft, so that the rotating shaft and the motor base and the rocker arm may rotate relative to each other. Solve the problem of loosening of the compression nut during long-term use.

It is apparent that the above-described embodiments are merely illustrative of the examples, and are not intended to limit the embodiments. Other variations or modifications of the various forms may be made by those skilled in the art in light of the above description. There is no need and no way to exhaust all of the implementations. Obvious changes or variations resulting therefrom are still within the scope of aspects of the invention.

What is claimed is:

1. A stabilizer folding structure comprising:
a motor base (1) pivotally connecting a rocker arm, said rocker arm comprising a heading arm, a cross roller arm and a tilting arm sequentially connected by a rotating motor;
an elastic member (2) for applying an elastic force for abutting the motor base (1) and the rocker arm;
a snap structure at a position where the motor base (1) abuts the rocker arm; in a first state and a second state, the snap structure is engaged to restrict relative rotation of the motor base (1) and the rocker arm;
in other states, the snap structure is disengaged such that the motor base (1) and the rocker arm are relatively rotatable;
wherein the motor base (1) and the rocker arm abut against each other, and the snap structure is disposed on an abutting surface;
a rotating shaft (3) having two ends, the two ends are respectively connected to the motor base (1) and the rocker arm, wherein the motor base (1) and the rocker arm are rotatable about the rotating shaft (3),
a stop sleeve (4),
a first mounting slot is opened at a joint of the motor base (1) and the rocker arm (11);
one end of the rotating shaft (3) is fixedly mounted in a first mounting slot (11);
the stop sleeve (4) is fixedly disposed in the first mounting slot (11);
a positioning sleeve (5), and
a second mounting slot (911) is defined in the rocker arm and the motor base (1), and the other end of the rotating shaft (3) is rotatably connected to the second mounting slot (911),
wherein the positioning sleeve (5) is fixedly disposed in the second mounting slot (911), and one side of the positioning sleeve (5) abuts against an end surface of the stop sleeve (4) when the motor base (1) is rotatably connected with the rocker arm, and the snap structure disposed on an end surface of the positioning sleeve (5) and the stop sleeve (4);
a buckle is disposed on an end surface of the positioning sleeve (5) and a latching position is set at least two recesses (41) corresponding to the at least one wedge-shaped boss (51) on the end surface of the stop sleeve (4), wherein in the first state and the second state, the at least one wedge-shaped boss (51) is engaged in the recess (41), wherein in the other states, the at least one wedge-shaped boss (51) abuts against the end surface of the stop sleeve (4); and
a limiting structure disposed at a position where the rocker arm is coupled to the motor base (1) for providing the rocker arm a rotational path that rotates relative to the motor base (1).

2. Stabilizer folding structure according to claim 1, wherein the buckle comprises two wedge-shaped bosses

(51) symmetrically disposed at an end face of the positioning sleeve (5) and disposed at 180 degrees.

3. The stabilizer folding structure according to claim 1, wherein the limiting structure comprises a limiting protrusion (52) disposed on an end surface of the one side of the positioning sleeve (5) and is opened in a limiting slot (42) on the end surface of the stop sleeve (4), wherein the limiting protrusion (52) limits a moment of the relative rotation of the rocker arm and the motor base (1) slide in the limiting slot (42).

4. The stabilizer folding structure according to claim 3, wherein an angle of a sliding path of the limiting protrusion (52) in the limiting slot (42) is 180° when the protrusion (52) slides to an end limit position in the limiting slot (42) to be in the first state, and when the limiting protrusion (52) slides in the limiting slot (42) to another end limit position of the other side to be in the second state.

5. The stabilizer folding structure according to claim 1, wherein the elastic member (2) is disposed in the second mounting slot (911), and a first end thereof abuts on the positioning sleeve (5), wherein a pressing structure is disposed at a second end of the elastic member (2) to bring the elastic member (2) into a compressed state.

6. The stabilizer folding structure according to claim 5, wherein the pressing structure comprises a compression nut (7) screwed to a shaft end of the rotating shaft (3), and the elastic member (2) comprises a disc spring, wherein the disc spring is sleeved between the compression nut (7) and the positioning sleeve (5).

7. The stabilizer folding structure according to claim 1, further comprising: a locking structure that is disposed at a position where the rocker arm is coupled to the motor base (1),
wherein the locking structure is in an open state in response to the rocker arm and the motor base (1) are relatively rotatable, and wherein the locking structure is in a locked state is in response to the rocker arm is fixedly connected to the motor base (1).

8. A handheld stabilizer comprising:
a stabilizer folding structure comprising:
a motor base (1) pivotally connecting a rocker arm, said rocker arm comprising a heading arm, a cross roller arm, and a tilting arm sequentially connected by a rotating motor;
an elastic member (2) for applying an elastic force for abutting the motor base (1) and the rocker arm;
a snap structure at a position where the motor base (1) abuts the rocker arm; in a first state and a second state, the snap structure is engaged to restrict relative rotation of the motor base (1) and the rocker arm;
in other states, the snap structure is disengaged such that the motor base (1) and the rocker arm are relatively rotatable;
wherein the motor base (1) and the rocker arm abut against each other, and the snap structure is disposed on an abutting surface;
a rotating shaft (3) having two ends, the two ends are respectively connected to the motor base (1) and the rocker arm, wherein the motor base (1) and the rocker arm are rotatable about the rotating shaft (3),
a stop sleeve (4),
a first mounting slot is opened at a joint of the motor base (1) and the rocker arm (11);
one end of the rotating shaft (3) is fixedly mounted in a first mounting slot (11);
the stop sleeve (4) is fixedly disposed in the first mounting slot (11);

a positioning sleeve (5), and
a second mounting slot (911) is defined in the rocker arm and the motor base (1), and the other end of the rotating shaft (3) is rotatably connected to the second mounting slot (911),
wherein the positioning sleeve (5) is fixedly disposed in the second mounting slot (911), and one side of the positioning sleeve (5) abuts against an end surface of the stop sleeve (4) when the motor base (1) is rotatably connected with the rocker arm, and the snap structure disposed on an end surface of the positioning sleeve (5) and the stop sleeve (4);
a buckle is disposed on an end surface of the positioning sleeve (5) and a latching position is set at least two recesses (41) corresponding to the at least one wedge-shaped boss (51) on the end surface of the stop sleeve (4), wherein in the first state and the second state, the at least one wedge-shaped boss (51) is engaged in the recess (41), wherein in the other states, the at least one wedge-shaped boss (51) abuts against the end surface of the stop sleeve (4); and
a limiting structure disposed at a position where the rocker arm is coupled to the motor base (1) for providing the rocker arm a rotational path that rotates relative to the motor base (1), wherein the limiting structure comprises a limiting protrusion (52) disposed on an end surface of the one side of the positioning sleeve (5) and is opened in a limiting slot (42) on the end surface of the stop sleeve (4), wherein the limiting protrusion (52) limits a moment of the relative rotation of the rocker arm and the motor base (1) slide in the limiting slot (42).

9. The handheld stabilizer of claim 8, further comprising: a handle assembly (10); one end of the tilting arm (93) is provided with a clamping portion (931), one end of the heading arm (91) rotatably connects with the handle assembly (10) through the motor base (1).

10. The handheld stabilizer according to claim 9, wherein the heading arm (91) is connected to the cross roller arm (92), the cross roller arm (92) and the elastic lock (6) is provided at the attachment position of the arm (93).

11. The stabilizer folding structure of claim 1, wherein the snap structure is configured in a first position in a first state and the snap structure in a second position in a second state.

12. The handheld stabilizer of claim 8, wherein the buckle comprises two wedge-shaped bosses (51) symmetrically disposed at an end face of the positioning sleeve (5) and disposed at 180 degrees.

13. The handheld stabilizer of claim 8, wherein an angle of a sliding path of the limiting protrusion (52) in the limiting slot (42) is 180° when the protrusion (52) slides to an end limit position in the limiting slot (42) to be in the first state, and when the limiting protrusion (52) slides in the limiting slot (42) to another end limit position of the other side to be in the second state.

14. The handheld stabilizer of claim 8, wherein the elastic member (2) is disposed in the second mounting slot (911), and one end abuts on the positioning sleeve (5), wherein a pressing structure is disposed at the other end to bring the elastic member (2) into a compressed state.

15. The handheld stabilizer of claim 14, wherein the pressing structure comprises a compression nut (7) screwed to a shaft end of the rotating shaft (3), and the elastic member (2) comprises a disc spring, wherein the disc spring is sleeved between the compression nut (7) and the positioning sleeve (5).

16. The handheld stabilizer of claim 8, further comprising: a locking structure that is disposed at a position where the rocker arm is coupled to the motor base (1), wherein the locking structure is in an open state in response to the rocker arm and the motor base (1) are relatively rotatable, and wherein the locking structure is in a locked state is in response to the rocker arm is fixedly connected to the motor base (1).

* * * * *